United States Patent [19]

Wolberg et al.

[11] Patent Number: 5,537,226
[45] Date of Patent: Jul. 16, 1996

[54] METHOD FOR RESTORING IMAGES SCANNED IN THE PRESENCE OF VIBRATION

[75] Inventors: George Wolberg, Forest Hills; Robert P. Loce, Webster, both of N.Y.

[73] Assignee: Xerox Corporation, Stamford, Conn.

[21] Appl. No.: 343,390

[22] Filed: Nov. 22, 1994

[51] Int. Cl.$^6$ .................................................. H04N 1/047
[52] U.S. Cl. ........................................... 358/486; 358/412
[58] Field of Search ..................................... 358/406, 412, 358/486, 494, 404, 444; H04N 1/047

[56] References Cited

U.S. PATENT DOCUMENTS

| | | |
|---|---|---|
| 4,628,368 | 12/1986 | Kurata et al. . |
| 4,748,514 | 5/1988 | Bell . |
| 5,153,644 | 10/1992 | Yang et al. . |
| 5,278,675 | 1/1994 | Kamiyama ............................. 358/412 |
| 5,336,878 | 8/1994 | Boyd et al. ............................ 358/514 |
| 5,373,372 | 12/1994 | Loewen .................................. 358/486 |

OTHER PUBLICATIONS

S. C. Som, "Analysis of the effect of linear smear on photographic images," Journal of the Optical Society of America, 61, 859–864 (Jul. 1971).

D. Wulich and N. S. Kopeika, "Image resolution limits resulting from mechanical vibrations," Optical Engineering 26(6), 529–533 (Jun. 1987).

O. Hader, I. Dror, and N. S. Kopeika, "Image resolution limits resulting from mechanical vibrations. Part IV: real-time numerical calculation of optical tranfer functions and experimental verification," Optical Engineering 33(2), 566–577 (Feb. 1994).

"Redundant Rastering for Decreased Vibration Sensitivity in Digital Printers," xerox Disclosure Journal, vol. 15, No. 1, (Jan./Feb. 1990), p. 31.

"Modular Driver For Image Scanners," Xerox Disclosure Journal, vol. 18, No. 1, (Jan./Feb. 1993), pp. 7–9.

R. Loce and W. Lama in "Exposure Strobing in Photocopiers," Journal of Imaging Science, 32(6), 238–247 (Nov./Dec. 1988).

F. Bestenreiner, U. Geis, J. Helmberger, and K. Stadler, "Visibility and Correction of Periodic Interference Structures in Line–by–Line Recorded Images," Journal of Applied Photographic Engineering, 2, 86–92 (1976).

K. Takiguchi, T. Miyagi, A. Okamura, H. Ishoshi and F. Shibata, "Effect of Photoreceptor Drum Rotational Speed Variation on Laser Beam Printer Halftone Reproduction," Proceedings of the SPSE Third International Congress: Recent Advances in Non–Impact Printing Technologies, 168–172, San Francisco (Aug. 1986).

D. Haas, "Contrast Modulation in Halftone Images Produced by Variation in Scan Line Spacing," Journal of Imaging Technology, 15 46(1989).

(List continued on next page.)

*Primary Examiner*—Kim Yen Vu
*Attorney, Agent, or Firm*—Duane C. Basch

[57] ABSTRACT

The present invention is a method and apparatus for restoring or correcting digital images scanned in the presence of mechanical vibration, thereby improving the quality of the output image. In a document scanner, a linear sensor moving relative to a document placed upon a platen is scanned in a manner wherein fluctuations in the nominal scanning velocity are observed. Recognizing that the output of a single photosensor in the linear sensor array is proportional to the integrated irradiance received by the sensor as it scans through an exposure region, when vibratory motion of the sensor array is considered, the actual size of the exposure region is time-varying. The fluctuations or vibrations introduce artifacts such as brightness fluctuation and geometric warping which are eliminated or significantly reduced in accordance with the method of the present invention. Specifically, the instantaneous velocity of the linear sensor array is used to reconstruct an underlying piecewise linear model of the irradiance distribution. That reconstructed image is then resampled under ideal scanning conditions to produce the restored output.

14 Claims, 8 Drawing Sheets

OTHER PUBLICATIONS

P. Schubert, "Periodic Images Artifacts from Continuous-Tone Laser Scanners," Applied Optics 25(21) 3880–3884 (1986).

R. Firth, D. Kessler, E. Muka, M. Noar, and J. Owens, "A Continuous Tone Laser Color Printer," Journal of Imaging Technology 14, 78(1988).

P. Burns, M. Rabbani, and L. Ray, "Analysis of Image Noise due to Position Errors in Laser Writers," Applied Optics 25,2158–2168 (1986).

P. Melnychuck and R. Shaw, "Fourier Spectra of Digital Halftone Images Containing Dot Position Errors," Journal of the Optical Society of America 5(8), 1328–1338 (1988).

S. Bloomberg and P. Engeldrum, "Color Error due to Pixel Placement Errors in a Dot Matrix Printer," Proceedings of the SPSE Third International Congress: Recent Advances in Non-Impact Printing Technologies, 257–260 (Aug. 1986).

R. Loce and W. Lama, "Halftone Banding due to Vibrations in a Xerographic Image Bar Printer," Journal of Imaging Technology, 16(1), 6–11 (1990).

METHOD FOR RESTORING IMAGES SCANNED IN THE PRESENCE OF VIBRATION

This invention was made with U.S. Government support under Grant No. IRI 9157260 awarded by the National Science Foundation. The Government has certain rights in this invention This invention relates generally to a method for restoring digital images that are scanned in the presence of mechanical vibration, and more particularly to the inversion of distortions resulting from mechanical vibration to produce digital output images as would be output by a scanner operating under uniform motion conditions, with no mechanical vibrations.

BACKGROUND AND SUMMARY OF THE INVENTION

The present invention is directed to a method operating in a data or image processing system, such as a digital computer, that restores images scanned in the presence of mechanical vibration, thereby improving the quality of the image. Images scanned in the presence of mechanical vibrations are subject to artifacts such as brightness fluctuation and geometric warping.

In one embodiment of a document scanner, a linear sensor array (LSA) typically passes beneath a document placed upon a platen, ideally, at uniform velocity. The output of a single photosensor in the LSA is proportional to the integrated irradiance received by the sensor as it scans through an exposure region. When vibratory motion of the sensor array is considered, the actual size of the exposure region is time-varying. This introduces artifacts such as brightness fluctuation and geometric warping.

The effect of motion on the resolution of analog imaging systems has been studied. The problem typically addressed concerns characterization of the image blur caused by motion during the integration time of a photosensitive imaging medium. In a typical case the blur is usually constant throughout the image and may be caused by linear or vibratory motion. The blur is constant because the devices commonly acquire the full spatial extent of the image at one time, as in a conventional photographic camera or flash exposure xerographic systems. Characterization of this spatial uniform blur leads to a deconvolution-type image restoration process, for example, S.C. Som, "Analysis of the effect of linear smear on photographic images," *Journal of the Optical Society of America*, 61,859–864 (July 1971), D. Wulich and N. S. Kopeika, "Image resolution limits resulting from mechanical vibrations," *Optical Engineering* 26(6), 529–533 (June 1987), and O. Hader, I. Dror, and N. S. Kopeika, "Image resolution limits resulting from mechanical vibrations. Part IV: real-time numerical calculation of optical transfer functions and experimental verification," *Optical Engineering* 33(2), 566–577 (February 1994). The present invention differs from that body of work in that it is directed to images digitized in a raster or scan line fashion where each line may be acquired with a different arbitrary velocity of the light sensing array.

Heretofore, a number of patents and publications have disclosed methods for correcting or compensating for unwanted mechanical motion in imaging devices, the relevant portions of which may be briefly summarized as follows:

U.S. Pat. No. 5,153,644 to Yang et al., issued Oct. 6, 1992, discloses the correction of image distortion resulting from vibrational or speed distortions between an imaging device and a photoreceptor in a xerographic printing apparatus.

U.S. Pat. No. 4,628,368 to Kurata et al., issued Dec. 9, 1986, teaches a method of controlling the sub-scanning of a document whereby any vibration in the reading section is prevented by controlling acceleration/deceleration in accordance with the status of a data buffer so as to eliminate image irregularity.

In "Redundant Rastering for Decreased Vibration Sensitivity in Digital Printers," *Xerox Disclosure Journal*, Vol. 15, No. 1, (January/February 1990), pp. 31, R. Loce, R. Melino, and W. Lama disclose the digitization of an image at a low frequency and the subsequent printing at a higher frequency so as to avoid a printer's sensitivity to non-uniform motion at the low frequency.

In "Modular Driver For Image Scanners," *Xerox Disclosure Journal*, Vol. 18, No. 1, (January/February 1993), pp. 7–9, R. Baran and R. Ryon teach the necessity of reducing uncontrolled carriage motion in a document image scanner.

Several authors have considered the effects of nonuniform photoreceptor motion and other sources of noise in slit scanning photocopiers and digital printers. R. Loce and W. Lama in "Exposure Strobing in Photocopiers," *Journal of Imaging Science*, 32(6), 238–247 (November/December 1988) characterized the periodic exposure level error caused by vibration in a slit scanning photocopier. F. Bestenreiner, U. Geis, J. Helmberger, and K. Stadler, "Visibility and Correction of Periodic Interference Structures in Line-by-Line Recorded Images," *Journal of Applied Photographic Engineering*, 2, 86–92 (1976), K. Takiguchi, T. Miyagi, A. Okamura, H. Ishoshi, and F. Shibata, "Effect of Photoreceptor Drum Rotational Speed Variation on Laser Beam Printer Halftone Reproduction," *Proceedings of the SPSE Third International Congress: Recent Advances in Non-Impact Printing Technologies*, 168–172, San Francisco (August 1986), and D. Haas, "Contrast Modulation in Halftone Images Produced by Variation in Scan Line Spacing," *Journal of Imaging Technology*, 15, 46 (1989) examined the effects of periodic scan line position errors when printing periodic binary patterns (e.g., halftones). P. Schubert, "Periodic Image Artifacts from Continuous-Tone Laser Scanners," *Applied Optics* 25(21) 3880–3884 (1986) and R. Firth, D. Kessler, E. Muka, M. Noar, and J. Owens, "A Continuous Tone Laser Color Printer," *Journal of Imaging Technology* 14, 78 (1988), analyzed banding in continuous tone prints due to periodic errors. P. Burns, M. Rabbani, and L. Ray, "Analysis of Image Noise due to Position Errors in Laser Writers," *Applied Optics* 25, 2158–2168 (1986), and P. Melnychuck and R. Shaw, "Fourier Spectra of Digital Halftone Images Containing Dot Position Errors," *Journal of the Optical Society of America* 5(8), 1328–1338 (1988) concentrated on the effect of random errors in the continuous tone and binary cases, respectively. S. Bloomberg and P. Engeldrum, "Color Error due to Pixel Placement Errors in a Dot Matrix Printer," *Proceedings of the SPSE Third International Congress: Recent Advances in Non-Impact Printing Technologies*, 257–260 (August 1986) analyzed the color error on a print that is caused by random pixel placement errors. R. Loce and W. Lama, "Halftone Banding due to Vibrations in a Xerographic Image Bar Printer," *Journal of Imaging Technoloqy*, 16(1), 6–11 (1990) employed exposure and xerographic models to examine vibration induced halftone banding in image bar printers.

In accordance with the present invention, there is provided a method performed in an image processor for processing data defining an image scanned in the presence of mechanical vibration to produce a restored output image, the steps comprising:

storing image irradiance data in a first memory, where each item of irradiance data stored therein represents a sample of an area of an original document;

storing, in a second memory, velocity data associated with the image irradiance data, wherein the velocity data reflects the relative instantaneous velocity of a scanning element travelling at a nonuniform rate with respect to the original document;

modeling, using the image irradiance data and velocity data, an approximation function to represent image irradiance at any point in time;

identifying control points as a function of a nominal scanning velocity and a fixed sampling time period; and resampling the approximation function, using the control points, to determine a restored irradiance level for each area of the original document.

In accordance with another aspect of the present invention, there is provided a method performed in an image input device for producing digital output data defining an original image substantially free of artifacts caused by mechanical vibration within the image input device, the steps comprising:

acquiring image data and storing the image data in a first memory;

concurrently acquiring positional data so as to produce instantaneous velocity data associated with the image data and storing instantaneous velocity data in a second memory;

using the instantaneous velocity and image data, reconstructing an underlying model of the irradiance distribution of the original image; and resampling the underlying model under ideal scanning conditions to produce digital output data defining the original image, wherein the digital output data will be substantially free of artifacts caused by mechanical vibration.

An object of this invention is to produce an output digital image consistent with a scanner operating under "ideal" or uniform motion conditions. The image restoration method described herein makes use of the relative instantaneous velocity between a linear sensor array and a document being scanned to reconstruct an underlying piecewise constant or piecewise linear model of the image irradiance profile. That reconstructed image is then suitable for resampling under ideal scanning conditions to produce a restored output digital image.

One aspect of the invention is based on the observation of problems with conventional image input scanners and the electromechanical measures adopted in such devices to minimize the impact of vibrations and other nonuniform motion. This aspect is based on the discovery of a technique that alleviates these problems by reconstructing an output image based upon data obtained for the irradiance levels of the image and a motion profile of the scanning array with respect to the document. This technique can be implemented, for example, by a data or image processing apparatus suitable for processing information produced by image input terminals including document scanners, digital copiers and facsimile machines.

The technique described herein is advantageous because it is inexpensive compared to other mechanical approaches directed to minimizing vibration in digital document scanners. In addition, it can be used to reconstruct images produced under nonuniform motion conditions so as to eliminate the effects of the nonuniformity on the irradiance levels recorded for regions of the image.

Figure 1:
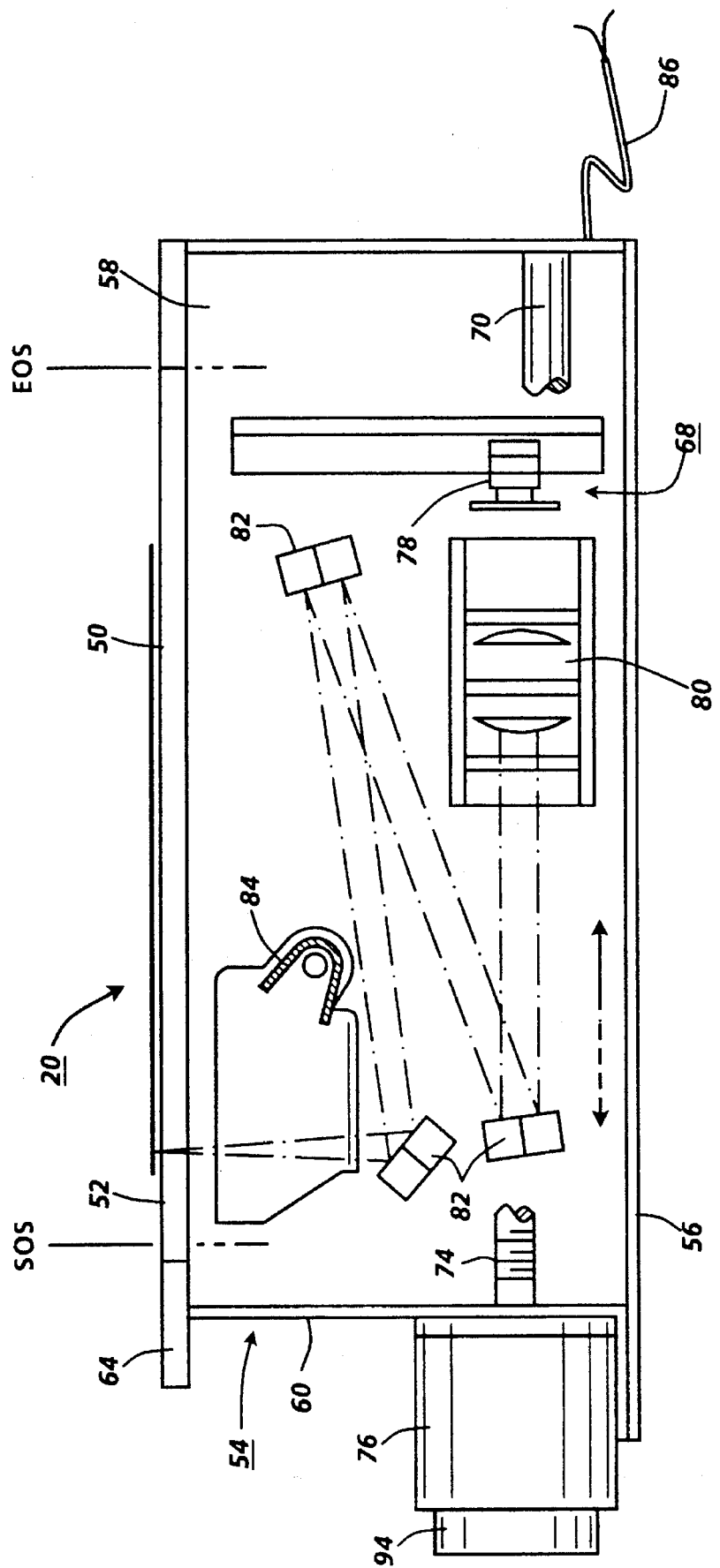
FIG. 1 is a schematic view of a raster input scanner of the type adapted to produce digitized images for processing in accordance with the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information and specifically includes image irradiance, position and velocity information. When an item of data can indicate one of a number of possible alternatives, the item of data has one of a number of "values."

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor memory (e.g., ROMs and RAMs).

"Memory circuitry" or "memory" is any circuitry that can store data, and may include local and remote memory and input/output devices. Examples include semiconductor ROMs, RAMs, and storage medium access devices with data storage media that they can access.

A "data processing system" is a physical system that processes data. An "image processing system" is a data processing system such as a computer workstation primarily employed to process data representing the characteristics of an image. A "data processor" or "processor" is any component or system that can process data, and may include one or more central processing units or other processing components.

An "array of data," "data array" or "array" is a combination of items of data that can be mapped into an array. A "two-dimensional array" is a data array whose items of data can be mapped into an array having two dimensions.

An "image" is a pattern of physical light. An image may include characters, words, and text as well as other features such as graphics. An image may be divided into "segments," each of which is itself an image. An example of a two-dimensional array is an array of image irradiance data acquired by a linear sensor array (LSA) from the surface of a document when relative motion is imparted between the LSA and the document. An item of data "defines" an image when the item of data includes sufficient information to produce the image. For example, a two-dimensional array can define all or any part of an image, with each item of data in the array providing a value indicating the color or irradiance level of a respective area of the image.

A "pixel" is the smallest segment or area into which an image is divided in a given system. In an array defining an image in which each item of data provides a value, each value indicating the color of an area may be called a "pixel value". Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An operation performs "image processing" when it operates on an item of data that relates to part of an image. An "image characteristic" or "characteristic" is a measurable attribute of an image. An operation can "measure" a characteristic by producing data indicating the characteristic using data defining an image.

A "version" of a first image is a second image produced using an item of data defining the first image. The second image may be identical to the first image, or it may be modified, such as by reduction or other image processing operations.

An "image input device" is a device that can receive an image and provide an item of data defining a version of the image. A "scanner" is an image input device that receives an image by a raster scanning operation, such as by scanning or rasterizing a document. Examples of image input devices include, but are not limited to, digital scanners such as the Xerox® 7650 ProImager, digital reprographic devices such as the Xerox® DocuTech Production Publisher, and facsimile machines such as the Xerox® 70XX Telecopier® family.

An "image output device" (IOT) is a device that can receive an item of data defining an image and provide the image as output. A "display" is an image output device that provides the output image in human viewable form. The visible pattern presented by a display is a "displayed image" or simply "image."

Figure 2:
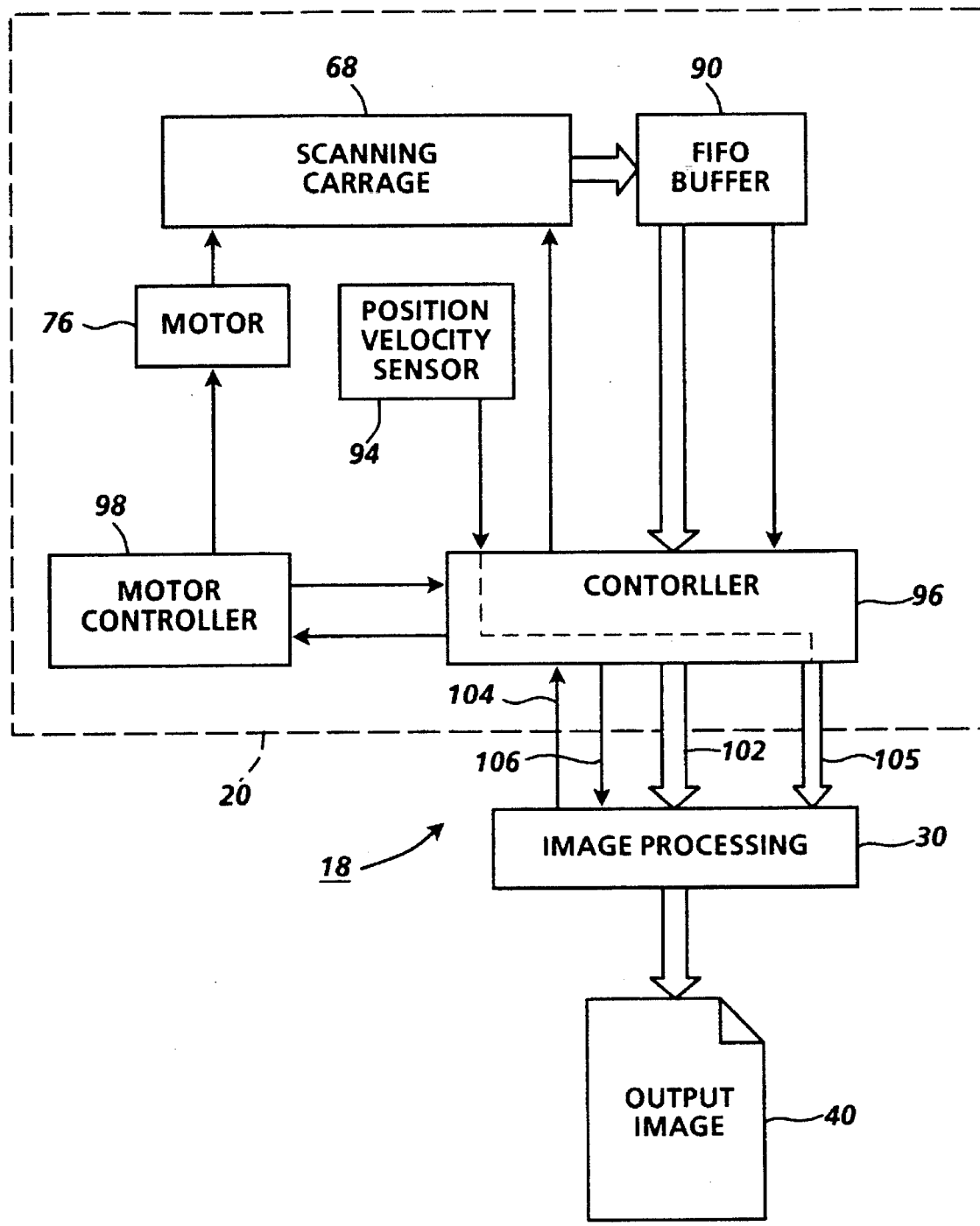
FIG. 2 is a schematic block diagram of a preferred raster input scanner and image processing system in accordance with the present invention.

The present invention finds particular use with a digital scanning embodiment as depicted in FIGS. 1 and 2, where an exemplary stationary-document, moving-carriage scanner 20 is shown. Although a preferred embodiment will be described with respect to a stationary document scanner, there is no intent to limit the present invention to such an embodiment. Moreover, the present invention finds use in numerous equivalent image input devices where relative motion is induced between a document and a linear sensor array (LSA) for the purpose of digitizing the document including, for example, moving document scanners where the document is moved relative to a fixed scanning array (facsimile machines), moving or stationary document scanners employing page-width scanning arrays. Scanner 20 is connected to an image processing system 30, to produce an array of image data 40 representing the irradiance levels obtained by scanning document 50 on platen 52. Scanner 20 further includes a housing 54 with base 56, sides 58 and ends 60. The top 64 of scanner 20 incorporates a generally rectangular transparent platen 52 sized to accommodate the largest original document 50 to be scanned. Document 50 may be located either manually on platen 52, or by a suitable automatic document handler (not shown).

A scan carriage 68 is movably supported within housing 54 for reciprocal movement beneath platen 52 on one or more longitudinally extending rails 70. Carriage driving means in the form of a drive screw 74 threadably engaged with carriage 68 is provided; rotation of screw 74 in either a clockwise or counter-clockwise direction by a reversible carriage driving step motor 76 serving to move carriage 68 in either a forward or reverse direction as shown by the arrows in FIG. 1.

A linear sensing array 78 such as a charge coupled device (CCD) is suitably mounted on scan carriage 68 in predetermined operative relation with platen 52 so as to scan the original document resting thereon. Suitable optical means, exemplified in FIG. 1 by lens 80 and mirrors 82, are provided to focus array 78 on a line-like area extending across the width of platen 52 and perpendicular to the direction of movement (scanning direction) of carriage 68. A lamp 84 is provided for illuminating a line-like area on which array 78 is focused. While the single scanning array 78 is shown and described, plural segments (CCDs) may be abutted or interlaced to form a larger array.

Referring to FIGS. 1 and 2, scanner 20 is adapted to be coupled, via communication line 86, with a local or remote image processing system, illustrated in FIG. 2 as image processing workstation 30. Workstation 30 may comprise a data processor and associated memory embedded within scanner 20, or may be an independent system, such as a personal computer, as illustrated. Scanner 20 further includes a relatively small memory buffer 90 through which the image signals of scanner 20, after conversion to digital format, are temporarily stored before output to workstation 30.

A suitable carriage position, or velocity sensor, shown here in the form of an encoder 94, is provided. Encoder 94 is conveniently mounted on the opposite or back side of motor 76 so as to sense rotation of drive screw 74 and generate, with rotation of screw 74, a succession of clock pulses representing movement of scan carriage 68 along rails 70. The clock pulse output of encoder 94 is set so that each clock pulse or block of clock pulses output by encoder 94 corresponds to movement of carriage 68 and the LSA supported thereon through a distance equal to a fractional portion of one scan line. Other arrangements for sensing displacement of scan carriage 68 relative to the document on platen 52 may be envisioned. For example, encoder 94 could be a differential encoder capable of producing a signal indicative of the instantaneous velocity of the scan carriage at any time.

A suitable microprocessor based controller 96 is provided for controlling and synchronizing operation of the component parts of scanner 20 when scanning document 50 in response to a demand for image data by image processing workstation 30. Controller 96 receives and sends control signals on lines 104 and 106, respectively. A suitable motor controller 98 for controlling starting, stopping, direction, and speed of carriage driving motor 76 in response to control signals from controller 96 is provided. Controller 96 also controls integration, transfer and output of LSA 78, and energization of scan lamp 84.

Output of image data is accomplished via data line 102, where intensity signals for individual image pixels, each representing an area or region of document 50, are transmitted in parallel to workstation 30. Also transmitted to workstation 30 is position/velocity information associated with each raster or scan line, wherein the information is accumulated by microcontroller 96 in response to signals from encoder 94, as previously described, and transmitted to workstation 30 via data lines 105. Subsequently, image processing workstation 30 operates on the image and motion data output by scanner 20 and stored within the workstation to produce a restored image 40 in accordance with the flowchart of FIG. 3.

Figure 3:
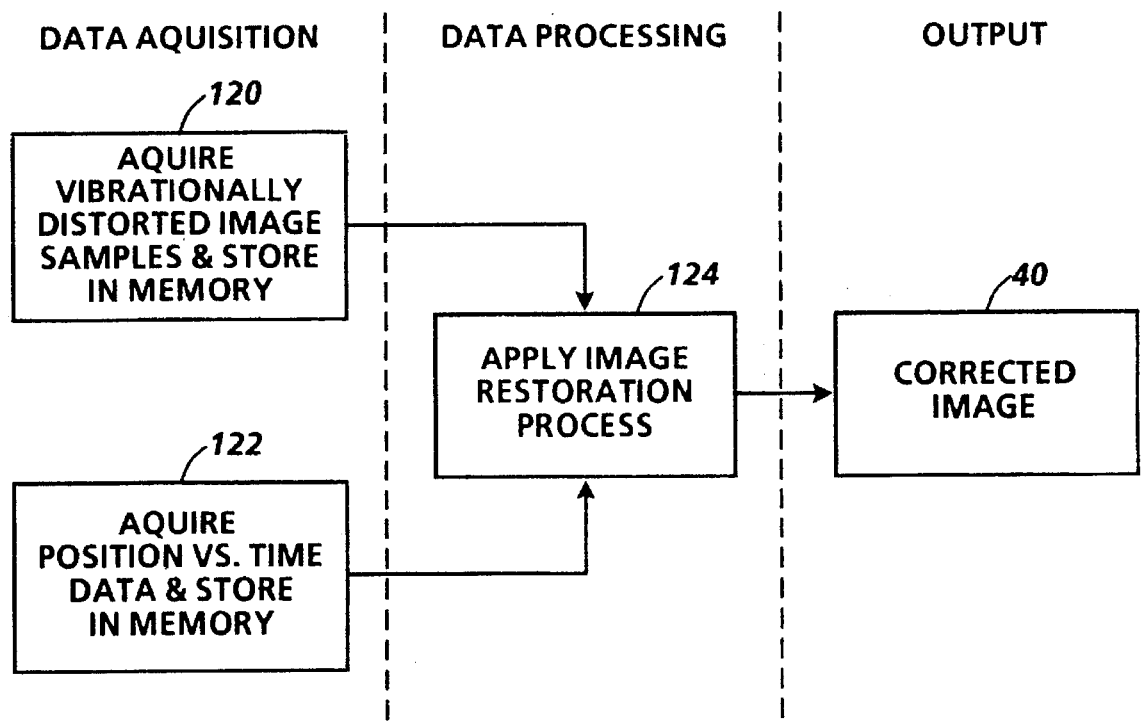
FIG. 3 is a generalized data flow diagram illustrating the various operational stages of the image processing system employed in accordance with the present invention.

Referring to FIG. 3, three principal operational stages are performed by the image processing workstation; data acquisition, data processing, and output. In the data acquisition stage, the image data generated by scanner 20 is received and stored in memory, block 120. Similarly, the positional information acquired by the scanner concurrent with the image data, is also received and stored in memory, block 122, for use by the image processing system. Once at least an initial portion of the image data is acquired, the data processing stage begins by performing an image restoration process, block 124, to produce as output the corrected or restored image 40.

Prior to description of the image processing (image restoration) method of the present invention, the basic problem of input scanning is reviewed, to establish a foundation for a detailed description of the invention. First input scanning will be described with respect to sampling in the time domain and then with respect to the spatial domain, for uniform and nonuniform velocities.

Sampling in the Time Domain

Figure 4:
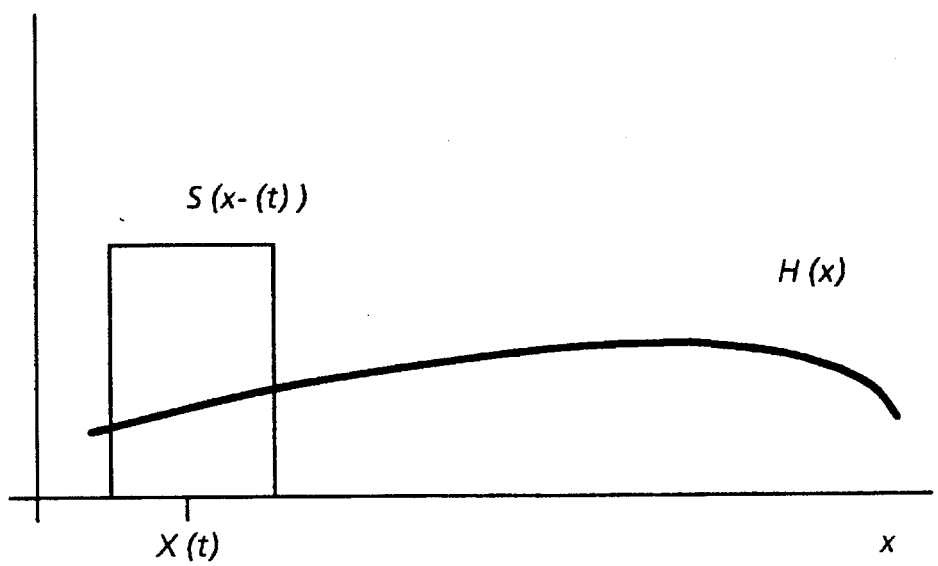
FIG. 4 is a graph illustrating photosensor sensitivity for a linear sensor array element and image irradiance as a function of distance.

Referring to FIG. 4 and considering the output of a single photosensor in a LSA, let $H(x)$ be the image irradiance distribution, and let $S(x-X(t))$ be the static photosensor sensitivity profile positioned at $X(t)$ at time $t$.

The instantaneous charge $C(X(t))$ generated by the photosensor is given by the product of the irradiance distribution and photosensor sensitivity profile integrated over space:

$$C(X(t)) = \int_{-\infty}^{\infty} H(x)S(x - X(t))dx. \tag{1}$$

This cross-correlation interval can be written as a convolution:

$$C(X(t)) = H(X(T)) * S(-X(t)). \tag{2}$$

Digitization is performed by integrating, or accumulating, the instantaneous charge for a period of time $T_{acc}$, and then sampling it at temporal intervals $T_s$, where $T_{acc} \leq T_s$. The $n^{th}$ sample is given by Equation 3.

$$F(n) = \int_{nT_s}^{nT_s+T_{acc}} C(X(t))dt = \int_{nT_s}^{nT_s+T_{acc}} H(X(T)) * S(-X(t))dt. \tag{3}$$

The integration in Equation 3 can be replaced by convolution with a rect function to yield Equation 4, $$F(t) = \sum_n \delta(t - nT_s)(H(X(t)) * K(t)), \tag{4}$$

where $$K(t) = rect(t/T_{acc}) * S(-X(t)), \text{ and} \tag{5}$$

$$rect(t) = \left\{ \begin{array}{l} 1 \; -0.5 < t \leq 0.5 \\ 0 \; \text{ otherwise} \end{array} \right\} \tag{6}$$

Note that the constant offset in rect, i.e., $T_{acc}/2$, has been omitted for notational convenience. Also, note that the array of Dirac delta $\delta$ functions allows collection of samples to be written as a temporal function by sampling the accumulated charge with period $T_s$.

The accumulated charge is seen to be the convolution of the image irradiance distribution H with a kernel K that combines the effects of sensitivity function S and the motion blur incurred during the accumulation time $T_{acc}$. While S may be referred to as the static integration aperture, we refer to K as the dynamic integration aperture because it takes motion blur into account. If it is assumed that S is rectangular in form and that there is uniform relative velocity between LSA and the document during the accumulation time, then K takes a trapezoidal form. Nonuniform velocity gives rise to distortions of the trapezoid.

The sampling electronics of scanner 20 (FIG. 1) digitize the image irradiance distribution over equal intervals in time. It is therefore straightforward to write the collection of samples as a temporal function, as seen above. However, it is the effect of vibratory motion on the digitized image that is of interest. For the purpose of analyzing image defects, the influence of vibration is best understood by recasting F in terms of spatial coordinate x.

Where the relative velocity between the LSA and document are a constant value V0, the position function $X(t)$ is $$X(t) = V_0 t. \tag{7}$$

Where the relative velocity is nonuniform, the deviations tend to be vibratory (periodic) so that the velocity may be expressed as a Fourier series, yielding the position function $$X_{vib}(t) = \int_0^t V(t')dt' = V_0(t) + \sum_i \frac{A_i}{2\Pi f_i}(\cos(\Phi_i) - \cos(2\Pi f_i t + \Phi_i)). \tag{8}$$

The velocity amplitudes are typically less than 1% of the nominal velocity $V_0$. The samples taken in the presence of vibrations can then be expressed by substituting the vibrational position function $X_{vib}(t)$ into Equation (3). The result is then recast in spatial coordinates and a Taylor series approximation is used to arrive at a result that is expressed independently of t:

$$F_{vib}(n) = \int C(X) \left( V_0^{-1} - V_0^{-2} \sum_i A_i \sin(2\Pi\beta_i X + \Phi_i) \right) dX. \quad (9)$$

where the upper and lower integration limits would be representative of both ends of the linear span over which the photosensor integration takes place. Hence, it is apparent that the nonuniform velocity affects the charge accumulation integral in two ways: the integration limits are changed and a second term appears that is a low amplitude sum of sinusoids. These two respective effects may be thought of as FM and AM modulation of the image signal by the vibration. They are tightly coupled because the sum of sinusoids serves to compensate for the changing integration limits, which vary only because the signal is integrated in space rather than time. The role of these effects can best be appreciated by considering their influence in maintaining a flat-field response when imaging a region of constant intensity in the presence of vibrations.

Scanner (IIT) Example

Having generally characterized the "behavior" of a photosite, the problem of nonuniform relative motion will be described with respect to operating parameters for the scanner of FIGS. 1 and 2. For example, in a 400 dots per inch (dpi) scanner the LSA passes over the document at about 2.5 in/second, or 63.5 µm/msec. Assume that:

(1) each photosensor on the array is approximately 5 µm wide and has a static field of view of about 63.5 µm in the scan direction, for a magnification factor of 0.11023;

(2) the time for acquiring a scanline is 1 msec. (approximately 90% of the time is used for accumulating charge, while the remaining 10% is used for other operations like reading and clearing the charge), the accumulation time is 0.9 msec, with accumulations beginning every 1 msec.

(3) instantaneous charge generation is linear with the irradiance received by the sensor.

(4) the actual velocity V(t) of the LSA typically varies less than 1% from the nominal velocity. Because velocity error tends to be vibratory, the variation can be modeled as a sum of sinusoids. Key frequencies to analyze are those that correspond to roughly 1 cycle/ram in the document space. This is due to the high sensitivity of the eye at this frequency. In the case of the typical scanner considered here, the sensitive temporal frequencies are about (1 cycle/mm)×(63.5 mm/sec.)× (0.11023), or 7.0 hertz.

Figure 5:
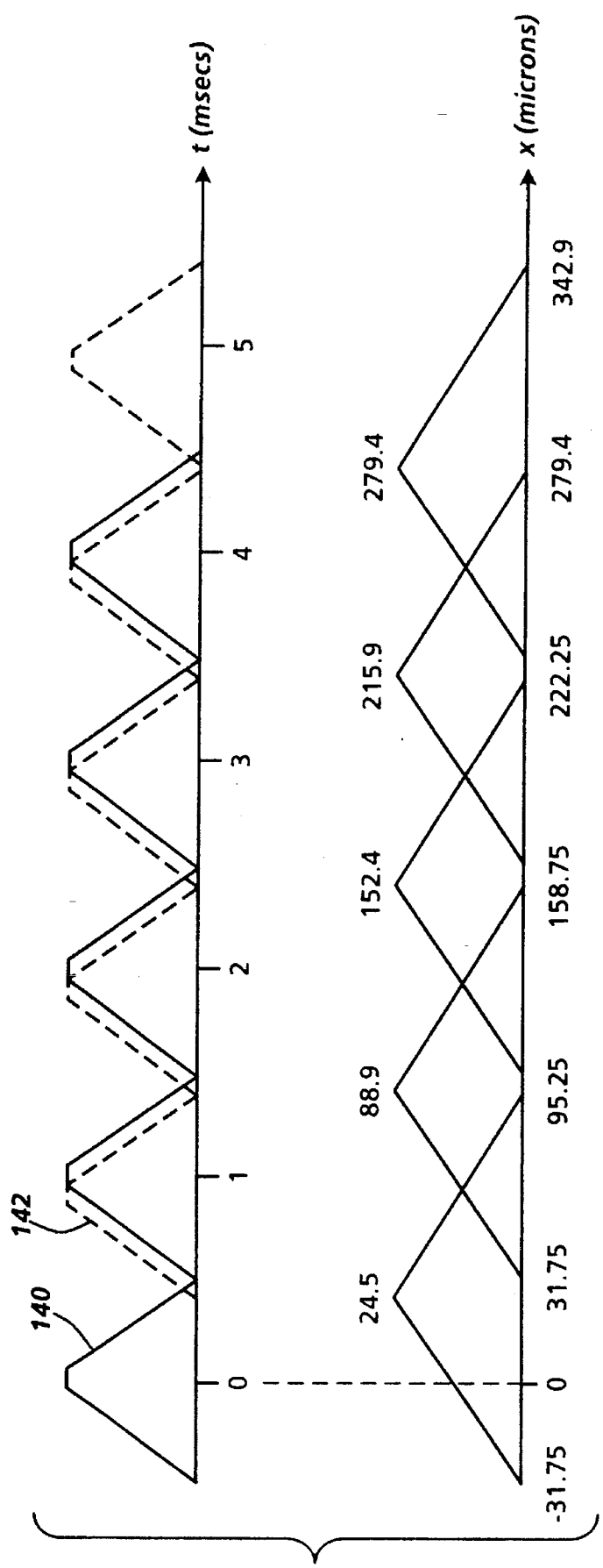
FIG. 5 is a graphical representation of the integration sites and kernels for a linear sensor array photosite as it scans over multiple integration periods.

These characteristic parameters are used in FIG. 5 to depict the uniform motion of an individual photosensor as it passes over a document. In the top graph of FIG. 5 solid lines 140 represent the photosensor field of view at the beginning of the integration intervals (0–4) while dashed lines 142 represent the photosensor fields of view at the ends of the integration intervals. The time at which each interval starts is indicated (in msec.) below the appropriate photosensor sites. Because the accumulation time is 0.9 msec. and the period between intervals is 1.0 msec., the fields of view at the ends of each interval overlap. This is a desirable property that avoids aliasing artifacts that may occur if the photosensor were not exposed to an intervening area. It is further assumed that all points under the field of view of the sensor are weighted equally. That is, sensitivity function S(x) is a rect function with a width of 63.5 µm in the document space.

The accumulation of charge on a single photosensor within the LSA produces an area sample associated with the region of the document traversed during one accumulation interval. That sample is actually a weighted integral of the underlying irradiance distribution, weighted by a kernel K [Equation (4)]. The weights reflect the contribution of each point on the irradiance distribution to the accumulated charge. The contribution of a point of the irradiance distribution is computed as the amount of time it is exposed to the moving field of view of the photosensor. Due to less exposure time for points at both ends of a photosensor's field of view, the kernel shape for the area sample is a trapezoid, and actually, nearly triangular. These kernels are depicted at the bottom of FIG. 5, with exemplary scan positions (in microns) at which the trapezoidal kernels change values noted. Assuming a constant scanning velocity, the top of each trapezoid is flat. Were the static field of view infinitesimally narrow, the kernel would be a scaled rect function.

Referring to the lower graph FIG. 5, at time 0, the photosensor is positioned at 0 µm and "sees" the scanline interval between −31.75 µm and 31.75 µm for a field of view of 63.5 µm. As a photosensor in the LSA moves in the scanning direction across the document at 63.5 µm/msec. it integrates the charge produced from the observed image. At the end of the 0.9 msec. accumulation time, the photosensor arrives at location 57.15 µm and has a field of view that extends between 25.40 µm and 88.90 µm, as illustrated. The accumulated charge for this first sample is equal to the integral of the underlying irradiance distribution multiplied with kernel K. Accumulation begins again at 1 msec, where the field of view extends from 31.75 µm to 95.25 µm, and continues through 1.9 msec when the charge is sampled. Accordingly, FIG. 5 shows the first four complete accumulation intervals.

Image Restoration

Figure 6A:
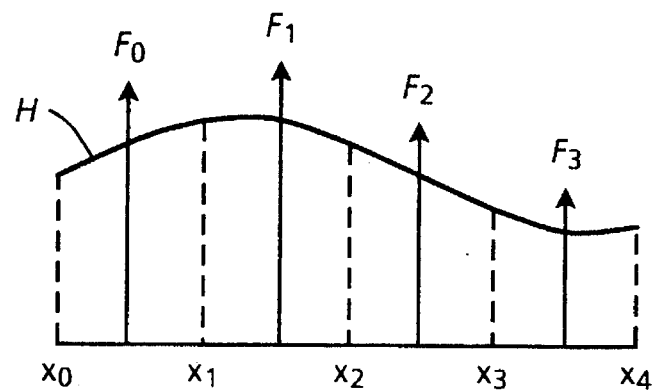
FIGS. 6A and 6B illustrate area samples taken under uniform and nonuniform photosensor velocities, respectively.
Figure 6B:
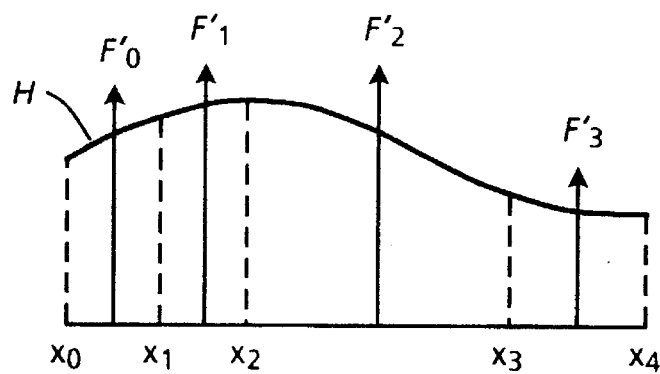

Having described the operation of a photosensitive site on a linear sensor array, attention is now turned toward the process for restoring images scanned in the presence of vibrations. Several simplifying assumptions and a description of an image model that permits the nonuniform velocity problem to be constrained in a manner that leads to a constructive solution are first described. The key assumption made is that the static integration aperture S is sufficiently narrow so that the dynamic integration aperture K may be approximated as a rect function. This is reasonable for some physical systems and it provides an image restoration process requiring minimal computation. In this case, each area sample is the unweighted integral of the image irradiance function spanned during the charge accumulation time. Furthermore, assume that the accumulation time and the sampling period is the same, i.e., the time needed to read and clear the charge is negligible ($T_{acc} \approx T_s$). As a further illustration, FIG. 6A shows a set of area samples $F_n$ and the underlying irradiance function H from which they are produced. In the ideal case of uniform LSA velocity, samples produced at regular intervals $T_s$ in time relate to the areas under H at regular intervals in space. When the sensor travels at nonuniform velocity, as represented for example by FIG. 6B, samples produced at regular intervals in time relate to the areas under H at irregular intervals in space, and it is apparent how the same input H now yields different output values $F_n'$.

The image restoration method claimed herein infers the underlying image irradiance distribution from the area samples so that H may be resampled (or more appropriately re-integrated) at regular intervals in space. Unfortunately, even with precise knowledge of the instantaneous LSA velocity V(t), this problem is underconstrained. It is not possible to infer continuous irradiance data from sparse area samples because there are an infinite number of irradiance distributions that share the same integral under the respective intervals. For development purposes the irradiance distribution is modeled as a linear spline (piecewise-linear function). By modeling H to consist of piecewise linear segments that may change only at regular intervals (H' in FIG. 7), it becomes possible to precisely infer H given the area samples $F_n$ and positions $x_n$ that delimit the nonuniform intervals. In practice, this piecewise linear constraint on H is not unreasonable given that the size of the interval is small, e.g., 63.5 μm, and the class of images of interest are continuous tone. When considering the blurring nature of some marking processes and print papers, it may also be reasonable to model halftones and text as a piecewise linear function. Although described with respect to piece-wise linear and piece-wise constant models (approximation functions), other approximation functions would also work. Once the general approximation function methodology described herein is understood it would be straightforward to derive alternative representations for other approximation functions.

Figure 7:
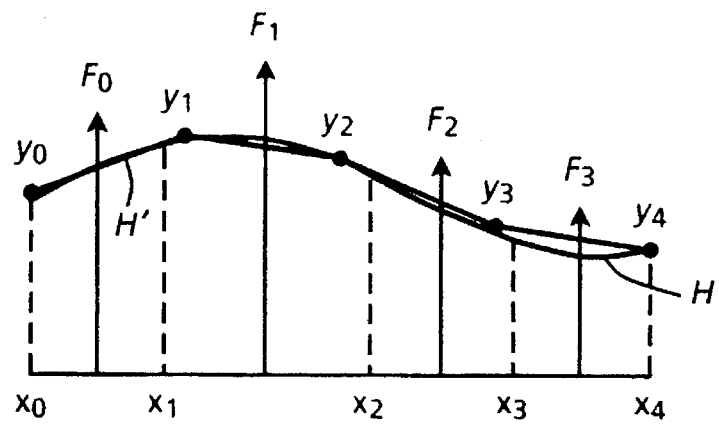
FIG. 7 is an illustration of the piecewise linear approximation used to model image irradiance used in accordance with the present invention.

The primary task in restoring the image is to recover the control points $y_n$ of the linear spline. As illustrated in FIG. 7, once the control points $y_n$ are determined, H may be reconstructed as a linear spline and area samples can be easily computed at regular intervals. In this manner, output consistent with that of an ideal scanner may be produced by the image processing workstation. Thus, FIG. 7 depicts an image irradiance distribution H and its linear spline approximation H'. The control points, $y_n$ (shown highlighted), lie at regular intervals $X_s = V_0 T_s$, where $V_0$ is the nominal velocity and $T_s$ is the sampling period.

Figure 8:
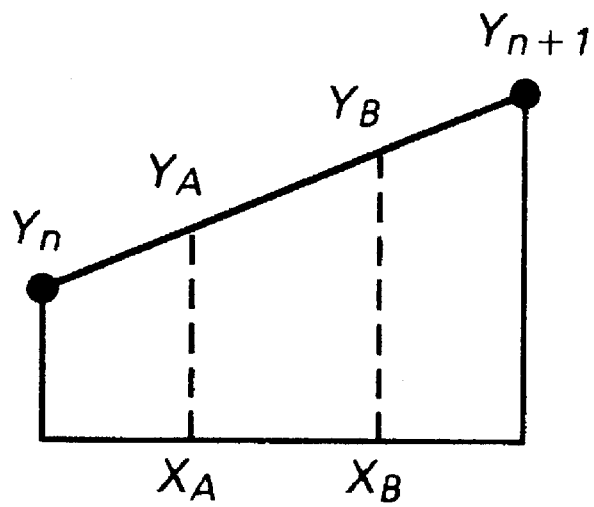
FIGS. 8 and 9 respectively illustrate the same interval and straddling two intervals area sampling cases treated by an embodiment of the present invention.
Figure 9:
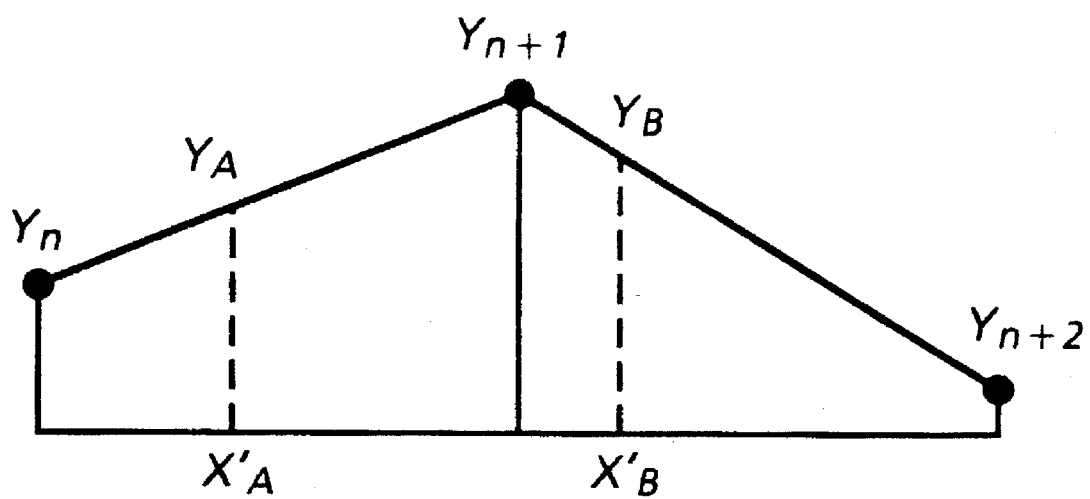

Area samples and position information are collected at regular time intervals by the scanner, however, one important assumption is that two consecutive LSA area samples must either lie in the same linear spline segment or straddle two segments. For example, FIG. 8 depicts the first case, where the extremes of the sample location ($x_A$ and $x_B$) lie in the same spline segment, while FIG. 9 depicts the second case where the area sample ($x_A' - x_B'$) straddles two spline segments. Upon treatment of the two cases illustrated in FIGS. 8 and 9, the collective representation yield a yield a tridiagonal system of equations, KY=F:

$$\begin{bmatrix} b_0 & c_0 & & & & \\ a_1 & b_1 & c_1 & & & \\ & a_2 & b_2 & c_2 & & \\ & & \cdot & \cdot & \cdot & \\ & & & \cdot & \cdot & \cdot \\ & & & & a_{n-2} & b_{n-2} & c_{n-2} \\ & & & & & a_{n-1} & b_{n-1} \end{bmatrix} \begin{bmatrix} y_0 \\ y_1 \\ y_2 \\ \cdot \\ \cdot \\ y_{n-2} \\ y_{n-1} \end{bmatrix} = \begin{bmatrix} 2F_0/W_0 \\ 2F_1/W_1 \\ 2F_2/W_2 \\ \cdot \\ \cdot \\ 2F_{n-2}/W_{n-2} \\ 2F_{n-1}/W_{n-1} \end{bmatrix} \quad (10)$$

The elements $a_i$, $b_i$, and $c_i$ are the weights of $y_{i-1}$, $y_i$, and $y_{i+1}$, respectively. They are expressed in terms of the known $x_A$ and $x_B$ positions. The first and last rows are influenced by choice of boundary conditions. For simplicity, border replication was chosen to determine pixel values that fall outside the domain of the image. That is, $y_{-1} = y_0$ and $y_n = y_{n-1}$. Therefore, if an additional term ($c_{n-1}$) is needed in the last row of tridiagonal matrix K, that term is added to $b_{n-1}$ because it reflects the influence of the last replicated pixel.

The control points in Y are evaluated by multiplying the known area samples F with the inverse of the tridiagonal matrix K. That is, $Y = K^{-1}F$. The inversion of tridiagonal matrix K has an efficient function that is solvable in linear time using well-known methods such as those described by W. H. Press, S. A. Teukolsky, W. T. Vetterling, and B. P. Flannery, *Numerical Recipes in C*, Cambridge University Press, 1992. It is important to note that the two cases for the positions of A and B described earlier may be extended. For instance, it is conceivable that A and B span more than two spline segments. The implication of this relaxed condition is that matrix K would no longer be tridiagonal, i.e., more off-diagonal elements will become nonzero. Efficient methods for solving a band diagonal linear system of equations are demonstrated below, where it is used to handle a trapezoidal shape for kernel K.

Figure 10:
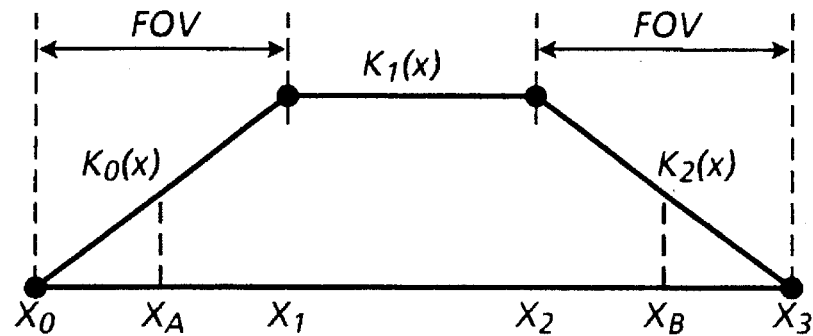
FIG. 10 is a graphical illustration of a trapezoid-shaped kernel employed in the reconstruction sampling method employed herein.

The tridiagonal system of equations described above is a consequence of the two assumptions enumerated; consecutive LSA positions never span more than two spline segments, and the LSA sensitivity function S is an impulse (i.e., kernel K is a rect function). For the example image model the assumptions are justifiable because the nonuniform LSA velocity generally does not exceed 1% of the nominal velocity. The latter assumption, however, is generally not true since infinitesimally narrow point spread functions (static integration apertures) are difficult to realize. As previously illustrated in FIG. 4, S has a field of view on the order of one dot size, e.g., 63.5 μm for a 400 dpi scanner. Since S has approximately the same width as $X_{acc}$, kernel K is trapezoidal, and very nearly triangular. Hence, FIG. 10 depicts the three intervals of a trapezoid, delimited by points $x_0$, $x_1$, $x_2$, and $x_3$. Note that the trapezoid extends beyond LSA positions $x_A$ and $x_B$, thereby widening the accumulation interval. The points delimiting the three trapezoid intervals may be expressed in terms of the field of view (FOV) of each photosensor. In FIG. 4, for instance, FOV=1 dot size. Note that FOV=0 corresponds to the ideal case where S is an impulse and K is a rect function. Rectangular S may be described by S=rect(x/FOV). If w=FOV/2, the following expressions for the trapezoid control points in terms of the photosensor sites $x_A$ and $x_B$ may be determined:

$$x_0 = x_A - w \quad (11)$$

$$x_1 = \text{MIN}(x_A + w, x_B - w) \quad (12)$$

$$x_2 = \text{MAX}(x_A + w, x_B - w) \quad (13)$$

$$x_3 = x_B + w \quad (14)$$

Figure 11:
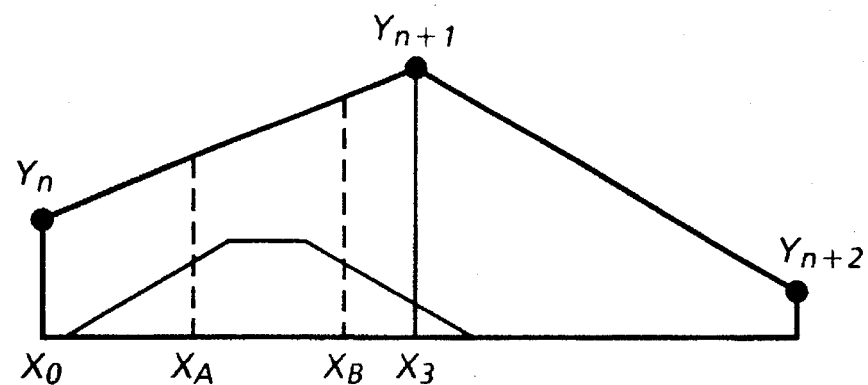
FIG. 11 is an illustration of the trapezoidal kernel of FIG. 10 being applied to sample data in accordance with the present invention.

Kernel K is defined as $$K(x) = K_0(x) + K_1(x) + K_2(x), \quad (15)$$

where $K_n(x)$ are as illustrated in FIG. 10. Moreover, FIG. 11 illustrates K being applied to the irradiance function H'.

Upon considering the cases where the trapezoid interval lies in one spline segment and straddles a pair of spline segments, it is then possible to solve for the control points as previously described. Each area sample is actually composed of three contributions; one from each of the three intervals of the trapezoid kernel K. Each trapezoid interval, depending on whether it lies in one or two spline segments, adds a constraint to two or three linear spline control points, respectively. Since the three intervals each constrain an overlapping set of three control points, there may be up to five neighboring points that contribute to each area sample. Collectively, they yield a pentadiagonal system of equations as shown below in Equation 16:

$$\begin{bmatrix} b_0 & c_0 & d_0 & e_0 & & & & \\ a_1 & b_1 & c_1 & d_1 & e_1 & & & \\ & \ddots & \ddots & \ddots & \ddots & \ddots & & \\ & & a_{n-4} & b_{n-4} & c_{n-4} & d_{n-4} & e_{n-4} & \\ & & & a_{n-3} & b_{n-3} & c_{n-3} & d_{n-3} & e_{n-3} \\ & & & & a_{n-2} & b_{n-2} & c_{n-2} & d_{n-2} \\ & & & & & & a_{n-1} & b_{n-1} \end{bmatrix} \begin{bmatrix} y_0 \\ y_1 \\ \vdots \\ y_{n-4} \\ y_{n-3} \\ y_{n-2} \\ y_{n-1} \end{bmatrix} = \begin{bmatrix} F_0 \\ F_1 \\ \vdots \\ F_{n-4} \\ F_{n-3} \\ F_{n-2} \\ F_{n-1} \end{bmatrix} \quad (16)$$

The matrix consists of one subdiagonal element and three superdiagonal elements. The elements $a_i$, $b_i$, $c_i$, $d_i$, and $e_i$ are the weights of $y_{i-1}$, $y_i$, $y_{i+1}$, $y_{i+2}$, and $y_{i+3}$, respectively. They are expressed in terms of the known $x_i$ and $x_{i+1}$ positions.

When the field of view FOV is nonzero, pixels beyond the image border must be considered when the photosensor is centered along the boundary. Because FOV is limited to be less than or equal to one dot size, there is no concern with addressing pixels beyond $y_{-1}$ or $y_n$. In both of these cases, though, the pixel replication boundary condition is applied to get $y_{-1}=y_0$ and $y_n=y_{n-1}$. This boundary condition is reflected in diagonal elements $b_0$, $d_{n-2}$, and $c_{n-1}$. The missing $a_0$, $e_{n-2}$, and $d_{n-1}$ terms that would apply to pixels beyond the image border must simply be added back into $b_0$, $d_{n-2}$, and $c_{n-1}$, respectively. Finally, the control points are evaluated by solving the band diagonal system of equations using an efficient lower triangular—upper triangular (LU) decomposition algorithm optimized for band diagonal matrices as described by W. H. Press et al. *Numerical Recipes in C*.

The present above description has focused on the image restoration process assuming rectangular and trapezoidal kernels to account for the dynamic integration aperture. These kernels account for the combined effect of the point spread function and motion blur of each element in the LSA. However, one assumption maintained throughout the above discussion is that the image irradiance distribution H can be satisfactorily modeled by a piecewise linear model (see FIG. 7). The control points solved for in the pentadiagonal system are those of a linear spline. If a smoother underlying function for H is desired then additional constraints would be needed in the system of equations and wider bands would be expected.

A higher-order fit to H, however, is actually undesirable in the present application. Intuitively, a smoother model prevents fast edge transitions from being modeled without excessive overshoots or undershoots near the edge discontinuities. This is akin to the well-known Gibbs phenomenon that predicts ringing near edges when reconstructing a signal with a truncated set of frequency terms in the Fourier series. For example, referring to FIG. 12, if a step edge (reference numeral 200) for the $F_n$ values is considered, oscillations 202 are present after crossing the edge from left to right. While the area under each segment of the curve remains satisfied by the reconstructed irradiance function H', a problem occurs when vibrations are introduced into the system as the intervals over which the integral is computed shift. In such cases, it is expected that the reconstructed image data will have excessive ringing due to the underlying model rather than due to shifting integration intervals. Smoother models for H do not improve the problem. Therefore, it becomes necessary to consider the effects of a piecewise constant approximation. The advantage of this approach is that discontinuities are readily handled. Because text and halftone images consist primarily of (near) step edges, this is an important consideration. Furthermore, the piecewise constant intervals are limited to a single dot size.

Figure 12:
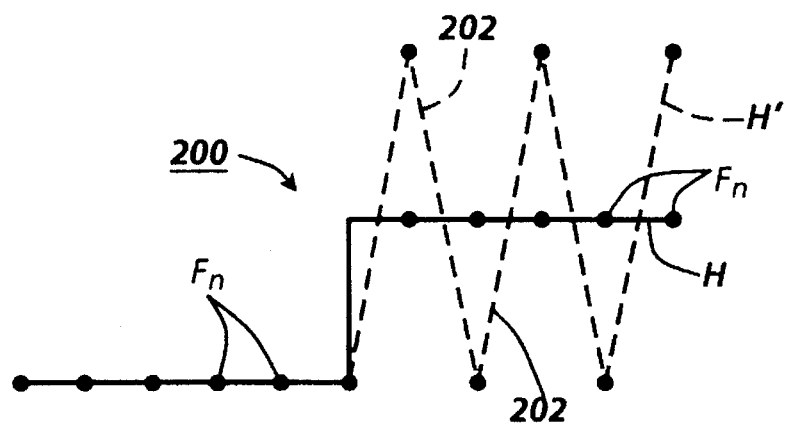
FIG. 12 is a graphical illustration of the effect of ringing (oscillations) caused by the piecewise-linear reconstruction algorithm when there are abrupt changes in image intensity.

Referring to FIG. 12, a piecewise constant fit to H is especially well suited for step edges, as depicted by the solid line. By making some simplifying substitutions, it is possible to derive expressions for the constraints placed on the unknown control points by the area samples in Equations 17a–c (one trapezoid perspline)

$$\frac{6F_{n_0}}{Wn} = y_n(x_0^2 - 2x_1^2 + x_0x_1 - 3x_0 + 3x_1) + y_{n+1}(-x_0^2 + 2x_1^2 - x_0x_1) \quad (17a)$$

$$\frac{2F_{n_1}}{Wn} = y_n(x_1^2 - x_2^2 + 2x_1 + 2x_2) + y_{n+1}(-x_1^2 + x_2^2) \quad (17b)$$

$$\frac{6F_{n_2}}{Wn} = y_n(2x_2^2 - x_3^2 + x_2x_3 - 3x_2 + 3x_3) + y_{n+1}(-2x_2^2 + x_3^2 - x_2x_3) \quad (17c)$$

and Equations 18a–c (trapezoid straddling spline segments). Expressions $$\frac{6F_{n_0}}{Wn} = y_n((1-x_0)^2) + y_{n+1}((x_0+2)(1-x_0) + x_1(3-2x_1)) + y_{n+2}(2x_1^2) \quad (18a)$$

$$\frac{2F_{n_1}}{Wn} = y_n((1-x_1)^2) + y_{n+1}(1-x_1^2 + (2-x_2)x_2) \quad (18b)$$

$$\frac{6F_{n_2}}{Wn} = y_n(2(1-x_2)2) + y_{n+1}((2x_2+1)(1-x_2) + x_3(3-x_3)) + y_{n+2}(x_3^2) \quad (18c)$$

for each area sample contribution when a trapezoid interval lies in one spline segment are shown in Equations 19a–c:

$$\frac{2F_{n_0}}{Wn} = y_n(x_1 - x_0) \quad (19a)$$

$$\frac{F_{n_1}}{Wn} = y_n(x_2 - x_1) \quad (19b)$$

$$\frac{2F_{n_2}}{Wn} = y_n(x_3 - x_2) \quad (19c)$$

and when a trapezoid interval straddles two spline segments:

$$\frac{2F_{n_0}}{Wn} = y_n(1 - x_0) + y_{n+1}(x_1) \quad (20a)$$

$$\frac{F_{n_1}}{Wn} = y_n(1 - x_1) + y_{n+1}(x_2) \quad (20b)$$

$$\frac{2F_{n_2}}{Wn} = y_n(1 - x_2) + y_{n+1}(x_3) \quad (20c)$$

Figure 13:
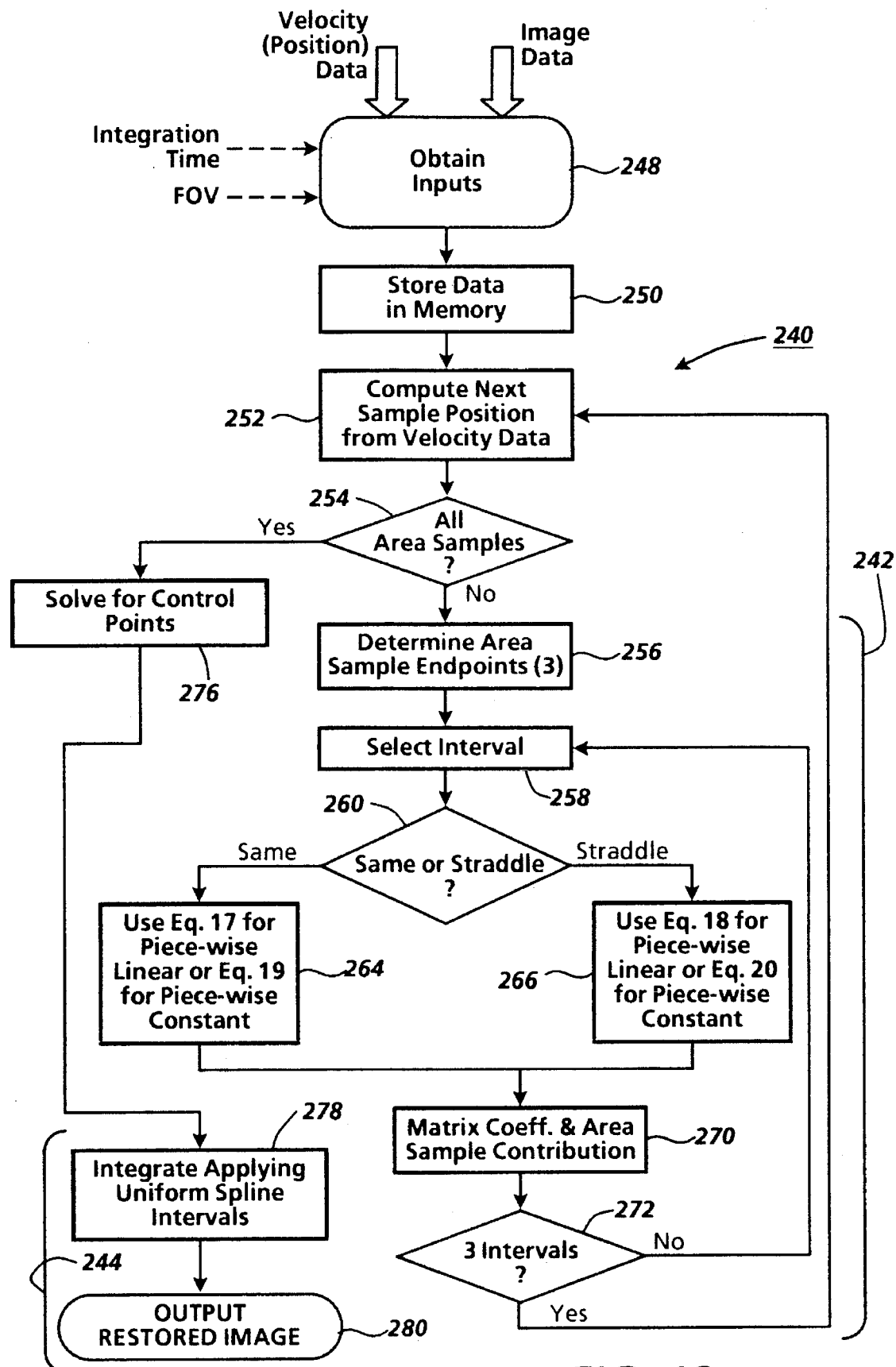
FIG. 13 is a flowchart depicting the individual process steps carried out by the image processing system of FIG. 2 to accomplish the restoration of image data acquired under nonuniform conditions in accordance with the present invention.

Having described the mathematical basis for the restoration process, details for the implementation of the methods described to restore an image scanned in the presence of vibrations will now be presented with respect to the flowchart of FIG. 13. While development of the present invention was based upon a model of distortion and a simulated scanning process, it has been established that the method of the present invention has particular application to the correction or reconstruction of images produced by a digitizing process having vibrational distortions. The process is generally comprised of three sub-processes illustrated with respect to the flowchart of FIG. 13: (a) characterizing the instantaneous velocity of the linear sensor array (240); (b) reconstructing an underlying piecewise polynomial model of the irradiance distribution (242); and then resampling the reconstructed image under ideal scanning conditions to produce the restored output (244).

Parameters that are inputs to the method for restoring the degraded image include: integration time $T_{acc}$; photosensor field of view FOV; and velocity V(t) as provided by position/velocity sensor (encoder) 94 used to monitor the position of the scanning array as a function of time (dX/dt). These inputs are obtained and stored in memory as illustrated by steps 248 and 250, respectively, in FIG. 13. The nominal velocity is normalized, allowing the equating of the integration distance $X_{acc}$ to the accumulation time $T_{acc}$. Furthermore, all amplitudes may be represented as a percentage of nominal velocity. Once these parameters are determined, some from the input data provided by the scanner and some as predefined values, the image processing system of FIG. 2 proceeds as illustrated.

Area samples degraded by an LSA moving at nonuniform velocity are collected and stored in image processing memory as part of the input data acquisition and storage steps 248 and 250. The evaluation of each area sample is implemented in three stages; one for each trapezoid interval. Equations 11–14 are first evaluated to determine the four points that delimit the intervals in each accumulation span as computed by step 252 and as illustrated in FIGS. 10 and 11. For each of the three trapezoid intervals (step 258), the endpoints are checked to determine if they lie in the same spline segment or straddle two segments, test 260. The outcome of test 260 determines whether Equations 17 and 19, or 18 and 20 are used to relate each area sample to the control points. In particular, for samples having endpoints within the same interval Equations 17a–c will be used in a piece-wise linear model, while Equations 19a–c will be used for a piece-wise constant representation (step 264) Similarly, Equations 18a–c will be employed as the piece-wise linear representation for endpoints that straddle segments while Equations 20a–c would be used in the piece-wise constant representation (step 266). Test 260, and the resulting selection of equations at steps 264 and 266, permit the computation of the matrix elements for each row in the band diagonal system of equations K shown in Equation 16, step 270. The area samples F and the positions computed for the area samples are inserted into the band diagonal system of equations K after the three iterations, one for each interval, controlled by test step 272. Computation of the matrix elements for each row in Equation 16 is computed in three phases accounting for each of the three trapezoid intervals. For piecewise linear splines, the terms in Equations 17a–c (same) or 18a–c (straddle) are accumulated into the matrix elements. Note that the factors of 2 and 6 in these equations may be folded into the coefficients for the linear spline control points. In this manner, the sum after the three phases permits the storage of $(F_{n_0}+F_{n_1}+F_{n_2})/W_n$, or simply $F_n/W_n$ directly in the column vector F, step 290. Note that F changes for each image row while K remains the same and must therefore be evaluated only once.

Next, the process solves for the control points Y in KY=F at step 294. An LU decomposition algorithm optimized for band diagonal matrices is used to solve for the control points Y at step 276 as previously described. Subsequently, the scanner simulation (or more appropriately integration) under "ideal conditions" is then applied to Y to produce the restored output image, step 278. Ideal conditions simply refers to the integration of uniform spline intervals that are delimited by the control points determined. The output of the process, step 280, is a restored image representative of image data that would have been produced by the scanner in the absence of mechanical vibrations.

Subsequent processing would proceed as described above to restore or correct image data for each pixel in each image raster produced by the output scanner. Although described with respect to a one-dimensional vibration system, where the impact of mechanical vibration is only in the scanning direction, the present invention may also have application in the restoration of images generated in systems having significant cross-scan (normal to the direction of scanning) vibrational motion as well. Moreover, although the present invention has been described with respect to both piece-wise linear and piece-wise constant models, or approximation functions, there is no intent to limit the invention to such functions. Other approximation functions would also work in the same general methodology described herein.

In recapitulation, the present invention is a method and apparatus for restoring or correcting digital images scanned in the presence of mechanical vibration, thereby improving the quality of the output image. In a document scanner, a linear sensor moving relative to a document placed upon a platen is scanned in a manner wherein fluctuations in the nominal scanning velocity are observed. Recognizing that the output of a single photosensor in the linear sensor array is proportional to the integrated irradiance received by the sensor as it scans through an exposure region, when vibratory motion of the sensor array is considered, the actual size of the exposure region is time-varying. The fluctuations or vibrations introduce artifacts such as brightness fluctuation and geometric warping which are eliminated or significantly reduced in accordance with the method of the present invention. Specifically, the instantaneous velocity of the linear sensor array is used to reconstruct an underlying piecewise polynomial model of the irradiance distribution. That reconstructed image model is then resampled under ideal scanning conditions to produce the restored output.

It is, therefore, apparent that there has been provided, in accordance with the present invention, a method and apparatus for restoring digital images scanned in the presence of mechanical vibration. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A method performed in an image processor for processing data defining an image scanned in the presence of mechanical vibration to produce a restored output image, the steps comprising:

storing image irradiance data in a first memory, where each item of irradiance data stored therein represents a sample of an area of an original document;

storing, in a second memory, velocity data associated with the image irradiance data, wherein the velocity data reflects a relative instantaneous velocity of a scanning element traveling at a nonuniform velocity measured with respect to the original document;

modeling, using the image irradiance data and velocity data, an approximation function to represent image irradiance at any point in time;

identifying control points as a function of a nominal scanning velocity and a fixed sampling time period; and resampling the approximation function, using the control points, to determine a restored irradiance level for each area of the original document.

2. The method of claim 1, wherein the step of modeling the approximation function comprises constraining the image irradiance approximation to a series of piecewise linear segments that change only at regular intervals.

3. The method of claim 1, wherein the image irradiance data is obtained by a plurality of photosites along a linear sensing array.

4. The method of claim 3, wherein the approximation function is weighted so as to represent a trapezoidal field of view for each photosite.

5. The method of claim 4, wherein the image approximation function is a piecewise model having a plurality of segments defined by the control points.

6. The method of claim 5, wherein the trapezoid is further characterized as including three intervals, and where a value for each interval is further defined as a function of the location of each interval.

7. The method of claim 6 wherein the interval lies completely within a segment of the piecewise model.

8. The method of claim 7 wherein the interval straddles at least two adjacent segments of the piecewise model.

9. The method of claim 1, wherein the step of modeling the approximation function comprises constraining the image irradiance approximation to a series of piecewise constant segments that change only at regular intervals.

10. The method of claim 1, wherein the step of identifying control points further comprises decomposing the nominal scanning velocity data as a function of fixed time intervals to solve for the control points Y, and where the resampling step comprises integrating the approximation function, using intervals delimited by control points Y, to produce the restored output image.

11. A method performed in an image input device for producing digital output data defining an original image substantially free of artifacts caused by mechanical vibration within the image input device, the steps comprising:

acquiring image data and storing the image data in a first memory;

concurrently acquiring positional data so as to produce instantaneous velocity data associated with the image data and storing instantaneous velocity data in a second memory;

using the instantaneous velocity and image data, reconstructing an underlying model of an irradiance distribution of the original image; and resampling the underlying model under ideal scanning conditions to produce digital output data defining the original image, wherein the digital output data will be substantially free of artifacts caused by the mechanical vibration.

12. The method of claim 11, wherein the step of reconstructing an underlying model of the irradiance distribution comprises constraining the image irradiance model to a series of piecewise linear segments that change only at regular intervals.

13. The method of claim 11, wherein the step of reconstructing an underlying model of the irradiance distribution comprises constraining the image irradiance model to a series of piecewise constant segments that change only at regular intervals.

14. The method of claim 11, wherein the resampling step includes identifying control points by decomposing the nominal scanning velocity as a function of fixed time intervals; and where the resampling step comprises integrating the underlying model of the irradiance distribution, using intervals delimited by the control points, to produce digital output data substantially free of artifacts.

* * * * *